United States Patent

[11] 3,597,924

[72] Inventors Murray Risin
Palm Beach Gardens;
Robert M. Snyder, Jupiter, both of, Fla.
[21] Appl. No. 797,523
[22] Filed Feb. 7, 1969
[45] Patented Aug. 10, 1971
[73] Assignee Ocean Science and Engineering, Inc.
Washington, D.C.

[54] FLOATING OIL BARRIER AND METHOD OF CONTAINING A FLOATING SUBSTANCE
14 Claims, 12 Drawing Figs.

[52] U.S. Cl. .................................................. 61/1, 61/5
[51] Int. Cl. .................................................. F02b 15/04
[50] Field of Search ........................................... 61/1, 5

[56] References Cited
UNITED STATES PATENTS
3,499,291  3/1970  Mikkelsen ..................... 61/1 F
FOREIGN PATENTS
980,732  1/1965  Great Britain ................. 61/1 F
1,305,469  8/1962  France ........................ 61/1

Primary Examiner—Peter M. Caun
Attorney—John J. Byrne

ABSTRACT: A system for circumscribing and impounding oils floating on the surface of water which includes a water-impervious, floating enclosing barrier presenting a substantially rigid vertical surface to the oil with means permitting limited movement of the barrier in the horizontal and vertical planes to compensate for constantly changing wave shapes and forms.

Patented Aug. 10, 1971

INVENTORS
ROBERT M. SNYDER
MURRAY RISIN

BY John J. Byrne
ATTORNEY

INVENTORS
ROBERT M. SNYDER
MURRAY RISIN

BY *John J. Byrne*

ATTORNEY

Patented Aug. 10, 1971

INVENTORS
ROBERT M. SNYDER
MURRAY RISIN

BY *John J. Byrne*
ATTORNEY

Patented Aug. 10, 1971

INVENTORS
ROBERT M. SNYDER
MURRAY RISIN
BY *[signature]*
ATTORNEY 3,597,924

FLOATING OIL BARRIER AND METHOD OF CONTAINING A FLOATING SUBSTANCE

The amount of oil and other petroleum products being shipped over our seaways has increased greatly in the last several decades. Because of this increase in total tonnage and the ever-increasing size of marine tankers being built for these purposes, serious damage can occur to adjacent land areas in the event of breakage, spills, or leakage from such vessels. Damage has also occurred in port areas because of tanker leakage and there is an ever-present danger of oil losses about offshore drilling installations.

A primary objective of this invention is to provide a means which is readily moved to the threatened area and which is quickly positioned so as to circumscribe the oil and contain it such that the oil can be subjected to other means of recovery and/or destruction.

Another principal objective of this invention is to provide a barrier to impound a floating substance which will substantially eliminate the floating substance from escaping over or under the bottom or top edges of the barrier.

A further objective of this invention is to provide a floating oil barrier which has means to compensate for either large wave swells or short steep waves.

A still further objective of the invention is to provide an oil barrier which is readily transported to the emergency area and which will withstand the rough handling oftentimes encountered in emergency situations.

A still further objective of the invention is to provide an oil barrier which has excellent storage facilities in that it can be rolled and stored on drums or reels. Such a storage method permits the rapid payout and installation of the barrier in emergency situations and at the same time reduces the storage area normally necessary for apparatus of the same general type.

A still further objective of the invention is to provide a floating oil barrier which can be constructed of materials which are resistant to deterioration by salt water, oil, fire and sunlight.

Another important objective of this invention is to provide an oil barrier of the type described which can be cleaned by steam or chemicals after its use.

Another important objective of this invention is to provide an oil barrier design which permits the fabrication thereof in either continuous lengths requiring connections only at its terminal ends or in the event of long barriers, a plurality of sections which can be interconnected to construct a single, continuous barrier.

These and other objects of the invention will become more apparent to those skilled in the art by reference to the following detailed description when viewed in light of the accompanying drawings wherein.

Figure 1:
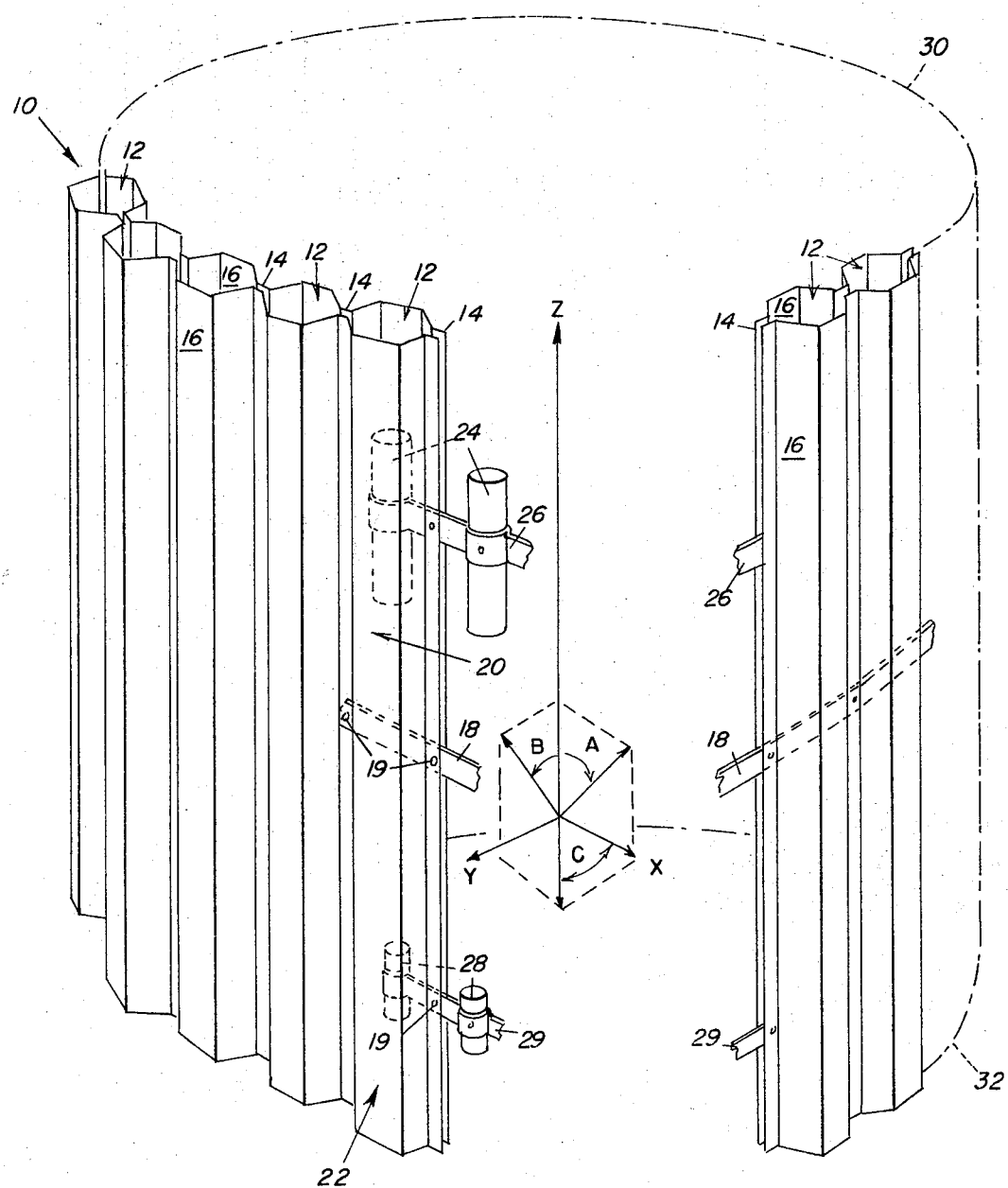
FIG. 1 is a diagrammatic perspective view of the barrier with a set of cartesian coordinators superimposed thereon for purposes of description.

Referring now to the drawings wherein like numerals indicate like parts, the numeral 10 generally indicates the floating barrier. In the construction of FIG. 1, the barrier is comprised of a series of semirigid metal or plastic segments 12 interconnected by web portions 14. Because of their configuration, the segments 12 are relatively rigid lengthwise. Each segment has a cross-sectional configuration of a hexagon. As will be understood more fully hereinafter, the hexagonal shape permits limited lateral expansion and contraction of its segment. The segments and web portions are conveniently fabricated from a pair of corrugated sections 16 of the type partially shown in FIG. 6. The sections 16 have opposed depressions which when placed in mating relationship form the hexagonal cross section. A constant length strap or cable member 18 runs the length of the barrier and is disposed between a pair of sections 16. The strap cable member is fixedly secured to webs 14 by bolts or rivetlike members 19. The strap can be said to divide each segment into an upper portion 20 and a lower portion 22. The cable maintains the intermediate points of connection of each segment in a fixed-distance relationship with one another.

Prior to fastening the opposing members 16 together by rivets, screws or the like, buoyancy units 24, which can be connected together via a resilient strap 26, are disposed in the depression of upper portion of each segment. Below the cable 18 a series of weight or ballast members 28 are disposed in each lower portion 22. For convenience and ease of construction, the weights are connected together via a resilient strap 29. The buoyant cells and ballast members 24 and 28 are of a shape and consistency which will not interfere with the contraction and expansion of the segments 12 as hereinafter described.

The assembled barrier 10 is defined by an upper edge 30 and a lower edge 32. At each of its terminal ends, the barrier is formed with an aluminum "U"-shaped configuration 31 which receives an elongated extrusion of neoprene 64. The terminal ends are quickly secured together by inserting friction grips 65 into "U"-shaped depressions. Such sealing and fastening systems are known to the art and hereinafter are referred to merely as the joining assembly 40.

Figure 4A:
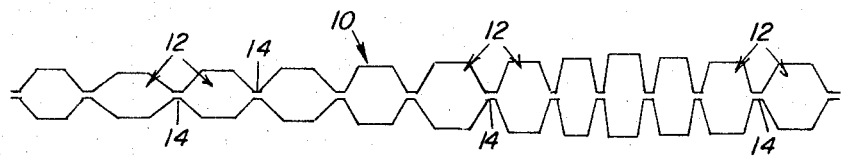
FIGS. 4A and 4B are, respectively, top and bottom diagrammatic plan views of a barrier positioned as in FIG. 2 but with the construction of FIG. 1.
Figure 3A:
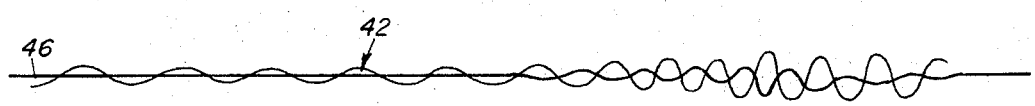
FIGS. 3A and 3B are, respectively, top and bottom diagrammatic plan views of the sections of barrier disclosed in FIG. 2.
Figure 2:
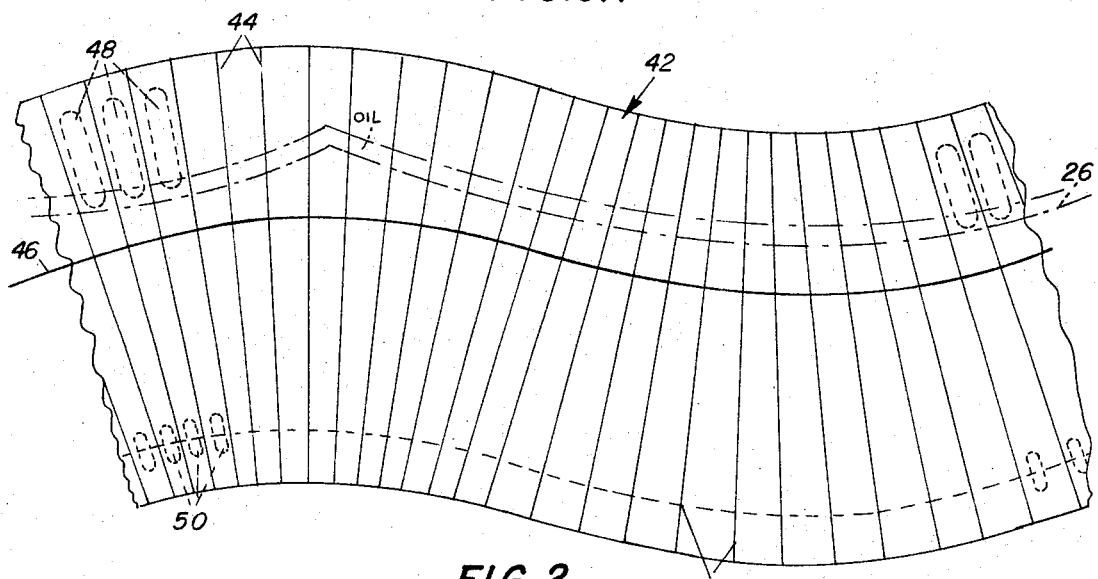
FIG. 2 is a diagrammatic elevation view of a portion of a barrier disposed in a body of water.
Figure 3B:
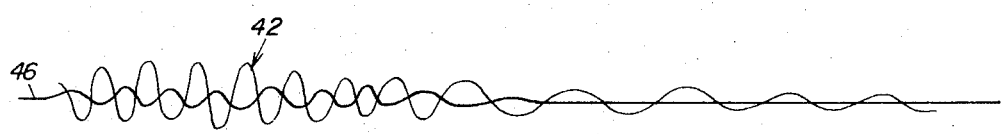
Figure 4B:
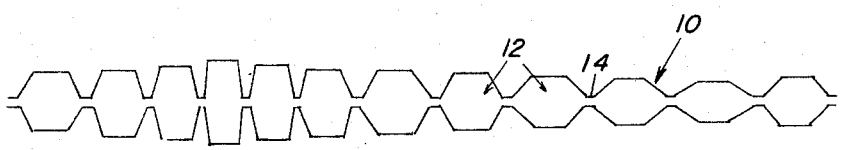

FIG. 2 shows an alternate construction of a barrier using a single sheet of flexible material 42 such as plastic. Equally spaced transverse stiffening rods 44 are secured along the longitudinal length of the barrier. A constant length cable 46 traverses the sheet and is connected to each rod 44. Buoyancy cells 48 are connected above the cable and ballast as weight members 50 are connected below the cable. FIGS. 4A and 4B illustrate the expansion and contraction of the segments of FIG. 1 as the barrier rises and falls with the wave pattern. FIGS. 3A and 3B illustrate the folding and expansion of the FIG. 2 embodiment for various wave patterns.

This invention considers the dynamic geometry of the air/water interface. That interface (the water surface on which the oil slick is carried) is depicted by the line 26. Of the six degrees of freedom involved, the three rotational degrees are important to problems of impounding oil within a barrier. The translational degrees of freedom are dependent upon deployment procedures rather than barrier construction and are not considered herein. The rotational degrees of freedom are indicated by superimposed cartesian coordinates in FIG. 1. The X coordinate is the longitudinal axis of the barrier along the cable 18, the Y coordinate lies on a horizontal line through the X-X axis; and the Z coordinate on a vertical line through the X-X axis. Angle B represents angular rotation about the X-X axis, the angle A represents rotation about a Y-Y axis; and the angle C represents rotation about a Z-Z axis. The Y-Y and Z-Z axes can be taken at any common point along the X-X axis.

Unless the barrier presents a vertical surface to the oil, the oil carried on the surface of the water will escape over the barrier at wave crests and will seep below the barrier at wave depressions. Therefore, in order to take full advantage of the barrier's height, the angle B must remain close to 0° that is, the barrier should be substantially fixed with respect to the Y-Z plane. This is accomplished through the ballast, the buoyancy cells and the longitudinal stiffness of segments 12 or the rods 44. So that the barrier can be rolled for storage and located about oddishaped oil slicks, flexibility in the X–Z plane, i.e., angle C is freely variable through about ±30°. In the structures of FIGS. 1 and 2 this is possible because of the inherent flexibility of the material utilized.

The barrier is provided with freedom to follow short-period or steep wave slopes in the X–Z plane, i.e., the angle A is variable in both directions. This ability to conform with wave pattern follows the general principles of both the FIG. 1 and FIG. 2 constructions. For a barrier having a height of 3 feet the radius of curvature in the plane of the barrier should be about 30 feet under average conditions and the barrier should be able to bend in both directions. This means that the upper and lower edges 30 and 32 of the barrier are capable of elongating and compressing at about a 1:12 ratio. The cable or strap 18 is provided to prevent the barrier from stretching along the X axis. The cable also provides a line of high strength for towing purposes.

Figure 5A:
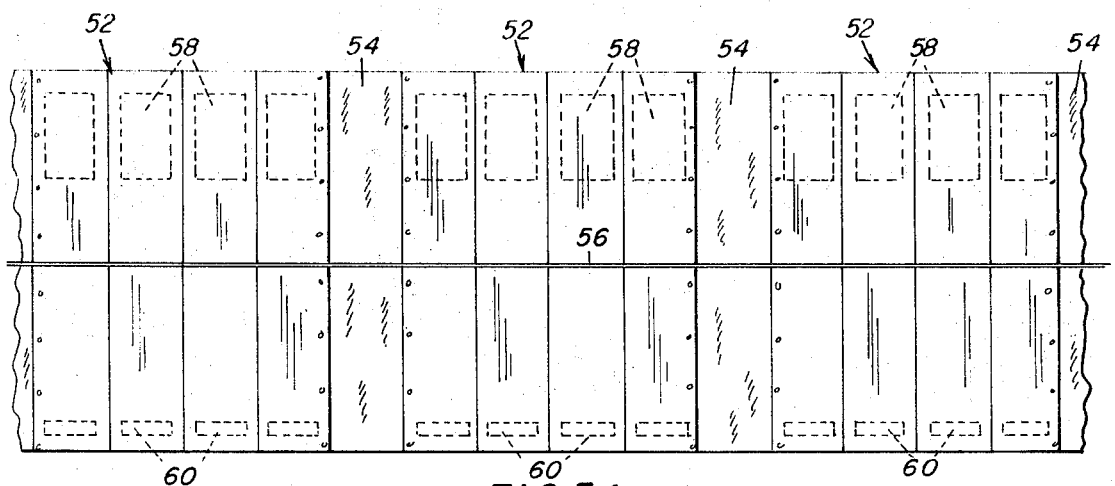
FIGS. 5A and 5B are diagrammatic illustrations of another type barrier construction.
Figure 5B:
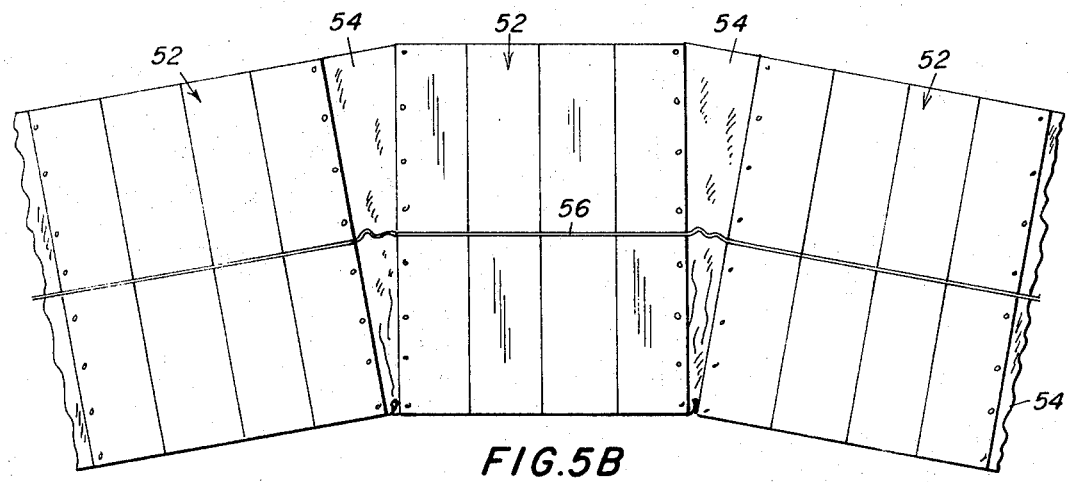

The barrier of this invention encompasses other means of construction. For instance, in FIGS. 5A and 5B there is shown a series of substantially rigid panel members 52 interconnected by flexible neoprene connections 54. Running throughout the length of this barrier is a cable 56 for stabilizing barrier length. A sufficient number of buoyancy cells 58 are secured above the cable and a sufficient number of ballast weights 60 are provided below cable 18 to maintain the barrier in a vertical position. As shown diagrammatically in FIG. 5B, the barrier can increase its upper edge length with a simultaneous shortening of its lower edge length so as to arch or fan with the oil-water interface. The interconnecting neoprene connections 54 provide substantially the same movement characteristics and natural resiliency as the segments 52. The panels of this embodiment can also be of aluminum, plastic, a specialized fabric, or other materials which are suitable to withstand this hostile environment.

Figure 6:
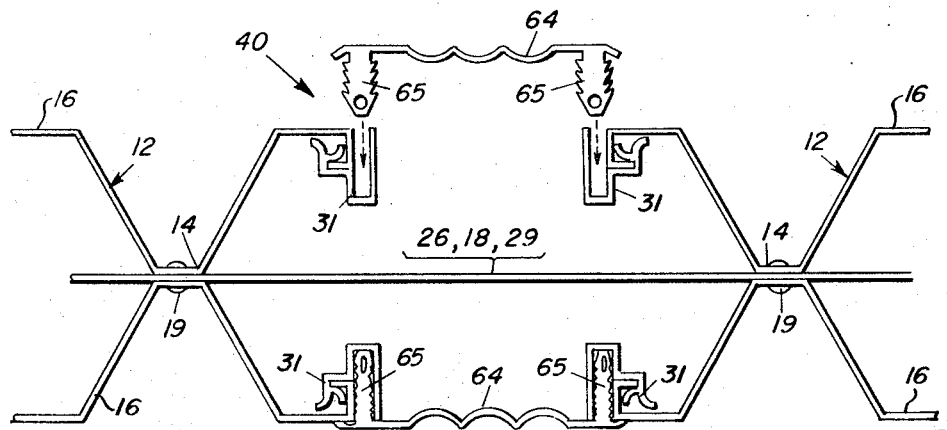
FIG. 6 is a plan view of a pair of barrier sections.

FIG. 6 shows the connector-sealing means 40 which can be used to quickly join a series of barrier sections together and/or to join their terminal ends. As mentioned heretofore, the barrier can be constructed of one single length or a series of lengths. In either event, there is at least one pair of terminal ends which must be quickly and sealingly secured in each embodiment. The ends of each segment are provided with an extrusion 31 which receives one end of a neoprene link 64 having sawtooth connector elements 65 adapted to be received by adjacent extrusions. A joint of this same general type is marketed by the Alcoa Corporation as a "Snug Seam-E" connection under the trademark Alply. It will be understood by those skilled in the art that other connector means are available for connecting terminal ends of panels. Where the aluminum corrugated units are used, their ends are readily shaped to receive a connector as shown. Where a sheet material is used (FIG. 2, for example) an appropriate extrusion can be affixed to its terminal ends.

Figure 7A:
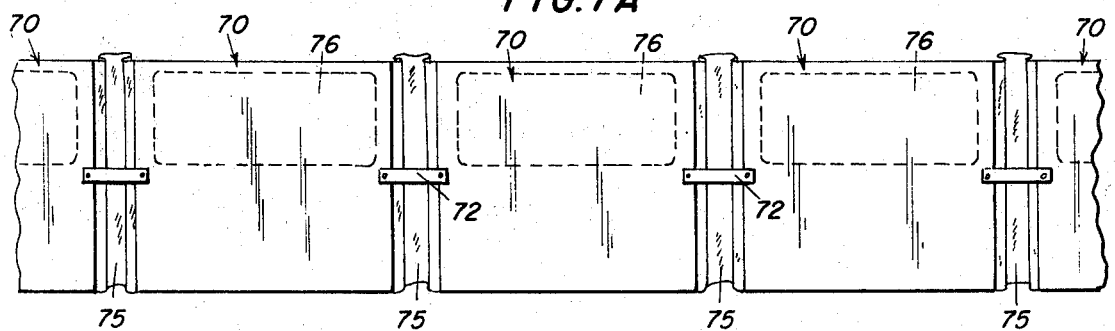
FIG. 7A is an elevation of another embodiment of the invention.
Figure 7B:
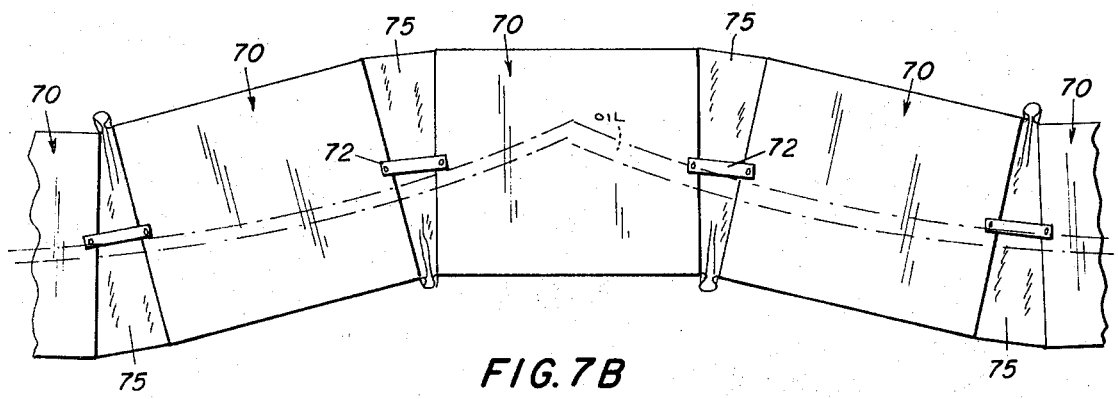
FIG. 7B is an elevation of the structure of FIG. 7A showing function.
Figure 8:
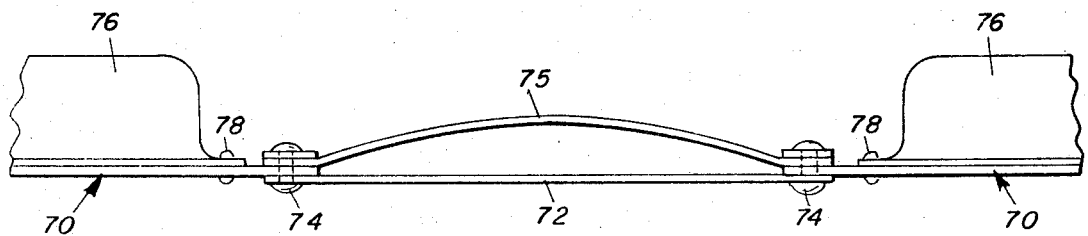
FIG. 8 is a fragmentary top plan view showing one of the flexible joints depicted in FIG. 7A.

Another mode of construction is shown in FIGS. 7A, 7B and 8. Here, a series of substantially rigid panels 70 are secured together by a series of rigid ties or straps 72. The connection is made by bolts 74 in a manner to permit a pivoting action. Flexible members 75 span the distance between adjacent panels and thus provide a continuous barrier. Buoyant members are secured to the upper portion of each panel by rivets, bolts, staples or the like 78. Weights (not shown) can be secured to the lower portions of the panels if they are of insufficient density to stay upright by themselves. Again, it can be noted, the function of this apparatus is similar to that of those embodiments previously described.

It can be seen that an important aspect of this invention is to provide a barrier which can crest and depress in response to the demands of the air/water interface. This function is accomplished by the ability of the barrier to expand and contract in the fanlike or accordianlike movement about the constant length members. The expansion and contraction can take place in the relatively rigid segments (FIG. 1) or it can take place in the material between segments (FIGS. 2–8).

We claim:

1. A device for impounding oil or other substances floating on or near the surface of a body of water comprising,
   an elongated continuous web of substantially flexible material having a top edge, a bottom edge and two free ends,
   a plurality of stiffening means attached to said web in spaced relationship and extending transversely of the longitudinal axis of said web, and
   a substantially constant length, nonrigid, elongated connecting means fixed to said web at said stiffening means and extending throughout the longitudinal length of said web along a line intermediate said top and bottom edges, the effective length of each segment of said connecting means between each of said stiffening means being less than that of the length along the same axis of each segment of said web between each of said stiffening means, whereby the portions of said web between said edges and said line can fan about horizontal axes extending through points lying on said line and normal to said web.

2. The invention of claim 1 including fastening means on said free ends whereby said ends may be fastened together to form a circumscribing impounding device.

3. The invention of claim 1 wherein said strap is flexible to permit said web to undulate horizontally normal to its longitudinal axis.

4. The invention of claim 1 wherein said strap is flexible to thereby permit said web undulation in the plane of said barrier as limited by the ability of said upper and lower portions of fan.

5. A device for impounding oil or other substances floating on or near the surface of a body of water comprising
   an elongated weblike barrier of semirigid material having an elongated top edge and an elongated bottom edge,
   said barrier comprising hollow segments spaced longitudinally of said barrier and extending transversely thereof, said segments being expansible and collapsible to increase and decrease the length of said barrier,
   means connecting said segments, and
   a substantially constant fixed-length strap joined to and extending longitudinally of said barrier along a plurality of points intermediate said top and bottom edges whereby when said hollow segments expand and collapse, the portions of said barrier between said edges and said strap are permitted to fan about horizontal axes extending through said points and normal to said barrier,
   said barrier being of sufficient buoyancy to maintain said top edge above the surface of said body of water.

6. The invention of claim 5 wherein said barrier comprises opposed semirigid corrugated sheets joined to define said hollow segments.

7. The invention of claim 5 wherein said barrier has two free ends and including fastening means on said free ends for joining said free ends.

8. The invention of claim 5 wherein said strap is flexible to permit said barrier to undulate horizontally normal to its longitudinal axis.

9. The invention of claim 5 wherein said strap is flexible to thereby permit said barrier to undulate in the plane of said barrier as limited by the ability of said upper and lower ends to fan.

10. The invention of claim 6 wherein said corrugated sheets are joined at abutting lands, and said hollow segments are hexagonal in cross section.

11. The invention of claim 5 including ballast means and buoyant means affixed to the lower and upper portions of said barrier respectively.

12. The invention of claim 5 wherein said barrier is of aluminum.

13. The invention of claim 5 wherein said barrier is of plastic.

14. The invention of claim 7 wherein said fastening means includes a U-shaped channel extending along the edge of each free end and a locking means insertable in said channels joining said ends.